(12) United States Patent
Sagues et al.

(10) Patent No.: US 10,404,529 B2
(45) Date of Patent: Sep. 3, 2019

(54) CONFIGURABLE, CONNECTORIZED SERVER-AUGMENTED CONTROL SYSTEM

(71) Applicant: XIO, Inc., Ross, CA (US)

(72) Inventors: Paul Sagues, Ross, CA (US); Mauritz Botha, Novato, CA (US)

(73) Assignee: XIO, INC., Ross, CA (US)

( * ) Notice: Subject to any disclaimer, the term of this patent is extended or adjusted under 35 U.S.C. 154(b) by 25 days.

(21) Appl. No.: 13/874,217

(22) Filed: Apr. 30, 2013

(65) Prior Publication Data

US 2013/0290496 A1 Oct. 31, 2013

Related U.S. Application Data

(60) Provisional application No. 61/640,200, filed on Apr. 30, 2012.

(51) Int. Cl.
*H04L 12/24* (2006.01)
*H04L 29/08* (2006.01)

(52) U.S. Cl.
CPC ........ *H04L 41/0803* (2013.01); *H04L 67/125* (2013.01); *G05B 2219/24215* (2013.01); *Y04S 40/18* (2018.05)

(58) Field of Classification Search
CPC ................ H04L 41/0803; H04L 29/06; H04L 29/08072; H04L 29/08981
USPC ........................................................ 709/220
See application file for complete search history.

(56) References Cited

U.S. PATENT DOCUMENTS

| 6,892,265 | B2 | 5/2005 | Sagues et al. | |
|---|---|---|---|---|
| 7,216,191 | B2 | 5/2007 | Sagues et al. | |
| 7,822,896 | B1 | 10/2010 | Sagues et al. | |
| 7,844,367 | B2 * | 11/2010 | Nickerson et al. | 700/284 |
| 7,913,303 | B1 * | 3/2011 | Rouland | H04L 63/1433 726/22 |
| 8,144,028 | B2 * | 3/2012 | LaMothe | G05B 23/0221 340/870.07 |
| 9,596,090 | B1 * | 3/2017 | Osburn, III | H04L 9/3268 |
| 2002/0199007 | A1 * | 12/2002 | Clayton | G06F 8/60 709/230 |
| 2003/0204756 | A1 * | 10/2003 | Ransom | G01D 4/004 713/300 |
| 2004/0117330 | A1 * | 6/2004 | Ehlers et al. | 705/412 |

(Continued)

FOREIGN PATENT DOCUMENTS

| EP | 2098925 A1 | 9/2009 |
|---|---|---|
| WO | WO2005/040946 A1 | 5/2005 |
| WO | WO2011/085477 A1 | 7/2011 |

OTHER PUBLICATIONS

International Search Report and Written Opinion dated Oct. 29, 2013 for PCT/US2013/03891.

(Continued)

*Primary Examiner* — Nicholas R Taylor
*Assistant Examiner* — Chong G Kim
(74) *Attorney, Agent, or Firm* — Pillsbury Winthrop Shaw Pittman LLP

(57) ABSTRACT

A configurable, connectorized system for providing supervisory and distributed control dramatically reduces the number of wire connections that must be made to connect sensors and actuators to a control system, reducing the number of different control hardware components required to connect one or more sensors and actuators through use of a configurable I/O module.

27 Claims, 8 Drawing Sheets

(56) References Cited

U.S. PATENT DOCUMENTS

| | | | |
|---|---|---|---|
| 2004/0260404 A1 | 12/2004 | Russell et al. | |
| 2005/0085928 A1* | 4/2005 | Shani | 700/18 |
| 2005/0086537 A1* | 4/2005 | Johnson | 713/201 |
| 2007/0135941 A1 | 6/2007 | Eastham et al. | |
| 2007/0255879 A1* | 11/2007 | Sagues et al. | 710/301 |
| 2008/0052356 A1* | 2/2008 | Johnson et al. | 709/204 |
| 2009/0057428 A1* | 3/2009 | Geadelmann | G05B 15/02 |
| | | | 236/51 |
| 2009/0118873 A1 | 5/2009 | Cheng et al. | |
| 2010/0299401 A1* | 11/2010 | Lloyd | G06F 15/16 |
| | | | 709/209 |
| 2011/0103284 A1* | 5/2011 | Gundavelli | H04L 12/18 |
| | | | 370/312 |
| 2011/0231176 A1* | 9/2011 | Sagues | 703/17 |
| 2012/0004786 A1* | 1/2012 | Lo | G05B 15/02 |
| | | | 700/296 |
| 2012/0086562 A1 | 4/2012 | Steinberg | |
| 2012/0099239 A1 | 4/2012 | Sagues et al. | |
| 2014/0325009 A1* | 10/2014 | Hood | H04L 67/34 |
| | | | 709/206 |
| 2015/0208489 A1* | 7/2015 | Dijk | H05B 37/0245 |
| | | | 315/294 |

OTHER PUBLICATIONS

Salihbegovic A et al., "Web based multilayered distributed SCADA/HMI system in refinery application," Computer Standards and Interfaces, Elsevier Sequoia, Lausanne, CH, vol. 31, No. 3, Mar. 1, 2009.

* cited by examiner

CONFIGURABLE, CONNECTORIZED SERVER-AUGMENTED CONTROL SYSTEM

RELATED APPLICATION

This application claims the benefit of U.S. Provisional Patent Application Ser. No. 61/640,200 filed Apr. 30, 2012, which is incorporated herein by reference.

FIELD OF THE INVENTION

The present invention relates generally to methods and apparatus for extending the capabilities of a control system which utilizes a configurable, connectorized input/output system using a network or server architecture.

BACKGROUND OF THE INVENTION

Control systems are widely used throughout the world. Such systems may be distinguished in their complexity from simple on/off temperature controllers (as would be found in a portable electric heater) to control systems of high complexity (as would be found controlling an entire petroleum refinery wherein many thousands of components are interconnected in order to manage the quality and quantity of product being produced).

Control systems may also be distinguished as centralized or distributed. These two distinguishable attributes of control systems—complexity and distributed nature—are themselves related because simple control systems are usually centralized, whereas complex systems often benefit from being distributed, if for no other reason because the systems are geographically large, as in the case of a petroleum refinery or electrical power grid. Control systems which are designed to operate in a distributed mode are called Distributed Control Systems (DCS). The above generalization notwithstanding, large geography is not the only driver for distributed control systems. For example, the substantial semiconductor fabrication tool market utilizes small machines whose high complexity requires large numbers of complex control components which can benefit from employing a distributed control architecture. The present invention is principally concerned with complex and distributed control systems and improvements thereto. However, the present invention applies equally well to the degenerate, non-distributed architecture.

While distributing a control system may simplify wiring and perhaps improve reliability, the act of distributing can cause difficulty in coordinating the actions of the various distributed pieces. Whereas there are many varieties of control systems, it is common to employ a Supervisory Control and Data Acquisition (SCADA) system to coordinate the various distributed control systems. As its name implies, the SCADA system does not usually perform the low-level control loop closure but rather the supervisory or coordinating role in keeping a large system running well. For example, in a petroleum refinery, a DCS can keep a given, local refining process stable whereas the SCADA system would adjust its rate and mixtures in order to keep this portion of the refining process synchronized with the rest of the many processes. The SCADA system performs this adjustment by modifying setpoints and other parameters in the DCS by communicating principally via a network connection, with the network connection generally inside of a Local Area Network (LAN) where communication timing, security and reliability is maintained.

Whereas SCADA systems rarely perform low-level loop control, the DCS itself may rely upon a lower-level control system such as Programmable Logic Controller (PLC). Indeed, in some more modern DCS systems, the PLC can play the role of a DCS. The PLC itself is made up of input/output modules (I/O modules) which connect to the sensors producing the information about the state of the process, and the actuators which provide the action of the control system. The prior art utilizes fixed-configuration I/O modules with multiple power supplies that necessitates custom wiring.

Referring to FIG. 1, we show three prior art fixed-configuration I/O modules, a first current input I/O module 21, capable of measuring industry standard 4-20 mA signals, a second frequency input I/O module 22, capable of counting pulses generated by a pulse device such as a water flow meter, and a third sourcing digital output I/O module 23, capable of driving contactors suitable for powering water pumps, for example. We note that these I/O modules are only three of many dozens of different I/O modules, such other variations being voltage output, current output, voltage input, digital PNP input, digital NPN input, and so forth. Each different variation of I/O module generally has unique wiring conventions, in general never directly from I/O module to sensor or actuator. Note the prior art connection means 20 for connecting an electrical conductor carrying an electrical signal or electrical power to a device, for example a pressure transducer 24. The device may be a sensor, actuator, power supply or I/O module. As is customary in the art, we employ any of a number of connection means 20 such as but not limited to terminal blocks, pluggable terminal blocks, crimped wire/connector devices with housings, circuit board mounted connectors and connectors utilizing soldered or welded joints. Connection means 20 is required at many places in any control system, and occurs one or more times with each device to effect the connection of signals and power to the sensors and actuators, for example when there is a distance of many meters employing multiple wire or cable systems. Also in FIG. 1 we show five devices, three sensors and two actuators as would be common in a water pumping application. Sensors for well depth 24 and pump electrical current 25 are presented to the I/O module as industry standard 4-20 mA signals which notably do not connect directly to the appropriate current input I/O module 21 but rather through some custom wiring and components 30 including terminal blocks 31 and device power supply 32, which is in addition to the module power supply 33. Connected to the frequency input I/O module 22 is a pulse generating sensor 26 such as is common in measuring water flow. The pulse generating sensor 26 requires one more wire than the two previous sensors 24 and 25. Note that only one of the three wires from the pulse generating sensor 26 is connected to the corresponding frequency input module 22. The other two wires connect utilizing custom wiring and components 30. Finally, two actuators, identical motor contactors 27, are wired to a sourcing digital output I/O module 23. As was the case with the sensors, the connection of the two actuators 27 to the I/O module 23 is not direct but also requires custom wiring and components 30.

FIG. 2 depicts the prior art component elements required to implement one node of a DCS control system 41. The DCS node 41 is made up of a PLC 40, three I/O modules 21, 22 and 23 and custom wiring and components 30 which include terminal blocks in addition to device power supply (shown as 31 and 32 in FIG. 1). Sensors and actuators 24, 25, 26 and 27 connect via custom wiring and components 30.

FIG. 3 depicts the prior art SCADA system 43 made up of three distributed nodes 41 connected inside of the LAN. The distributed nodes 41 are connected—employing either a physical connection or a software connection—via peer-to-peer connections 28 one to another. In addition, the distributed nodes 41 are connected in a polling arrangement to a SCADA computer 42, normally inside of the LAN in order to provide good coordinating control among the distributed nodes 41.

Thus a completed SCADA system 43 utilizing one or more DCS components 41 must provide for wiring of the sensors such that the control system may measure with the sensors, compute based upon what it is instructed and what it measures, and then act to open valves, turn on pumps and heaters, utilizing actuators connected to fixed configuration output modules by way of custom wiring and additional power supplies.

The principal method of extracting information from the lowest level sensors via their associated I/O modules involves polling. Polling is accomplished by the higher-level control component as it sends a message requesting a specific value, sometimes called a tag. Polling is an active process that occurs from the upper level of the control system toward the lower level of the control system. Thus the PLC will poll the I/O module for the state of a sensor. The SCADA system will then poll the DCS or PLC system in order to retrieve that same sensor state or a combination of sensor states so that this information is available at the top level, the SCADA computer 42. The same process is employed to change the state of an output. The upper level control component sends a similar message to the lower level device instructing it to effect some kind of change to an output, either setting a level or turning it off or on.

An important operating mode of modern prior art SCADA, DCS or PLC systems is for the higher level control elements to initiate the communication with the lower levels, the levels being numerous, involving the I/O modules, the PLC, the DCS and the SCADA system.

There are exceptions to this operating mode, for example but not limited to, the use of alarms where an asynchronous event can cause a message to be sent from the DCS to the SCADA system. However, this exception does not change the fundamental and predominant mode of operation being initiated at the upper level and directed to the lower level.

Prior art SCADA, DCS or PLC systems are complex collections of many parts. At the lowest level, the sensor and actuator interface, the prior art systems employ largely fixed configuration I/O modules, thus separate products or separate product permutations are required in order to deliver many electrical interfaces such as 4-20 mA, +/−10V, Frequency, Level, NPN, PNP, sensor power and so forth. Multiple I/O modules are therefore commonly required. The multiple I/O modules typically plug into some bus interface. Sensor and actuator wiring require power supplies, terminal blocks and many wires.

Prior art SCADA 43 or DCS 41 systems are themselves layered by levels such that the SCADA computer 42 is connected via a network to one or more DCS systems 41 which may either be a PLC 40 or the DCS 41 connected via another layer to a PLC 40. Many hardware components are therefore required to implement a SCADA 43 or DCS 41 system.

On the software side, prior art I/O modules, e.g. 21, 22 and 23, in general, perform the electrical interface function, whereas the device-level software is handled in the PLC 40 or DCS 41. Device-level software includes software for linearizing, filtering, counting, differentiating, calibrating, enabling, sequencing and scaling the electrical value to engineering units. In order for a PLC 40 or DCS 41 to compute a pulse rate, for example, it is required to poll and input I/O module for the current value of the pulse input and then precisely time its period and track its frequency. Errors in computing a precise and accurate rate are very sensitive to measurement timing, thus delays in the polling by the PLC 40 or DCS 41 can negatively affect sensor measurement quality.

In summary, the prior art SCADA 43 and DCS 41 systems are highly complex, being made up of many different components with layers conducting top-to-bottom polling to bring information and control up to the upper layers of the control system.

SCADA systems 43 traditionally run on a standard computer platform such as a PC running a commercial operating system such as Microsoft Windows-XP or Microsoft Windows-7 or Microsoft Windows-8. DCS systems 41 also make extensive use of this PC architecture. Because the DCS 41 and often SCADA system 43 require tight and reliable connection to the process, these PC computers must be localized on-site, sometimes removed from offices where the PC can be more easily supported. Such localization removed from office networks, is often required to improve network determinism or predictability of response given the aforementioned effect that timing has on measurement accuracy.

SUMMARY OF THE INVENTION

The present invention includes a configurable connectorized method and apparatus for providing supervisory and distributed control. It dramatically reduces the number of wire connections that must be made to connect sensors and actuators to the control system. The present invention dramatically reduces the number of different control hardware components which are required to connect one or more various sensors and actuators by use of a single part number, configurable I/O module.

The present invention utilizes a software configuration method and apparatus that produces a computer file record used to electrically configure the configurable I/O module. The file record may also be used to tabulate the configuration. The tabulation may then be printed in the form of a wiring guide to be attached to the control panel or wiring location. The tabulation may also be used to configure and program a server which is then able to produce a user interface or UI, thereby eliminating the prior art manual and custom code generation on the server. The tabulation may also be employed to provide system documentation. The tabulation may also be employed to produce labels for individual conductors to be connected to the I/O module, with the goal of reduced wiring errors.

The present invention provides device-level software inside the I/O module. The invention provides software for sequencing multiple inputs and outputs to effect initialization, enabling, reading, holding, latching, counting, differentiating, resetting, presetting, of analog and digital levels inside the I/O module. The invention provides closed loop control, e.g. temperature control, among one or more inputs and one or more outputs all inside the same I/O module with no external components other than the sensors and actuators. It also provides sequencing software and logic applied to setpoints and parameters of closed loop controls with all software, inputs, outputs and power provided from within the same configurable, connectorized I/O module.

The present invention provides a secure connection to a server, with the server providing supervisory control and data acquisition and preferentially not being located within the LAN or on-site, in order to reduce requirements for local management of the servers. The invention includes, on the server, a data base software system, preferably a relational data base, into which data sent by the configurable connectorized I/O module to the server is stored. The invention further employs digital rights management in order to increase security in connections from the configurable, connectorized I/O module to the server. The invention also provides for autonomous control and distributed control independent of any server connection within the I/O module or multiple I/O modules, in order to perform control functions absent a server connection. The invention also provides for notification via the Internet, telephone or texting in the event that the I/O module fails to contact the server within a given amount of time or by a repeated pattern.

The invention provides software to be run on standard servers, employing cloud computing, which provides supervisory computing, input to the software including sensor and I/O module state sent from the configurable, connectorized I/O module to the server and output from the software including actuator and I/O module state sent from the server via a response from the server requested by the configurable, connectorized I/O module acting as a client of the server.

The invention does not require the I/O module to accept an unsolicited request from anywhere except optionally from within the LAN.

The invention provides peer-to-peer network connection to other I/O modules in order to obviate the need for a local master polling host or any host separate from the server, where the server preferentially is not located within the LAN or on-site.

The invention provides for setpoints in the I/O module to be changed within a range via a response from a request made to the server by the I/O module. The invention provides for the expiration of a setpoint originating from the server after a configurable period of time, and at the same time then reverting to a setpoint determined by the I/O module itself—or itself and one or more peers—such that local control will provide adequate but presumably inferior control when compared to the control effected with the server setpoint determination.

IN THE DRAWINGS

DETAILED DESCRIPTION OF THE INVENTION

Figure 1:
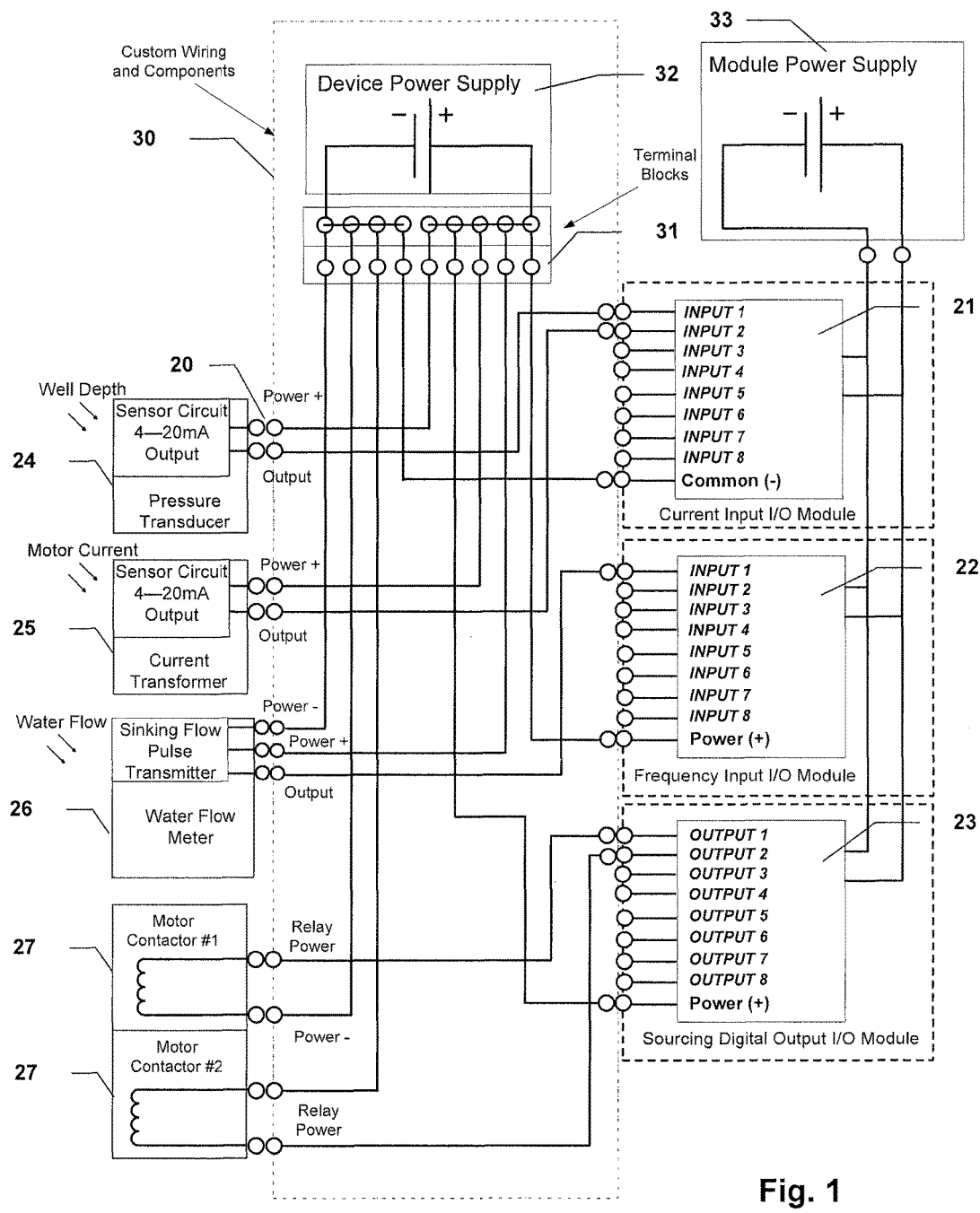
FIG. 1 is a typical prior art sensor and actuator connection method and apparatus employing multiple, fixed-configuration I/O modules.
Figure 2:
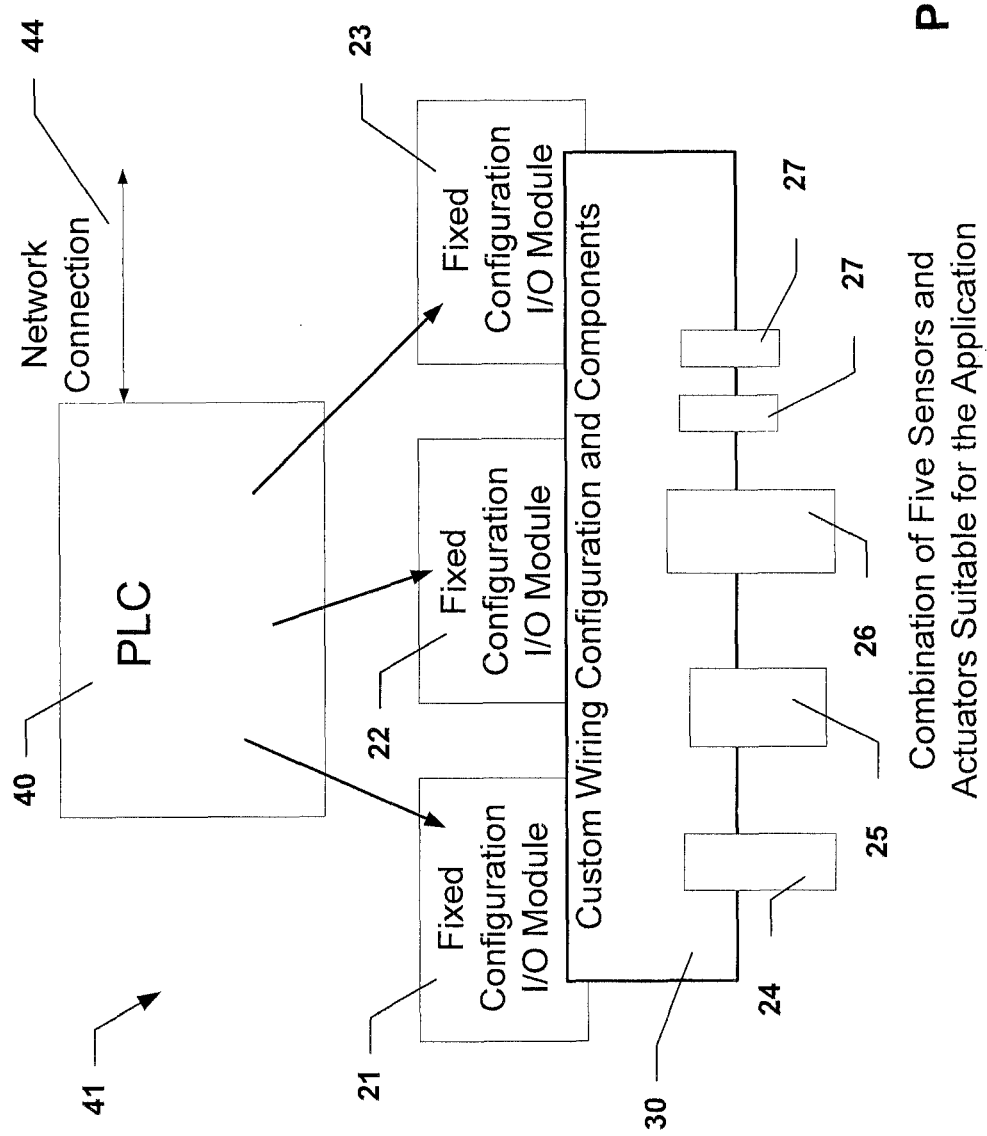
FIG. 2 is a prior art DCS made up of a PLC, three I/O modules, custom wiring configuration and components and a collection of five sensors and actuators.
Figure 3:
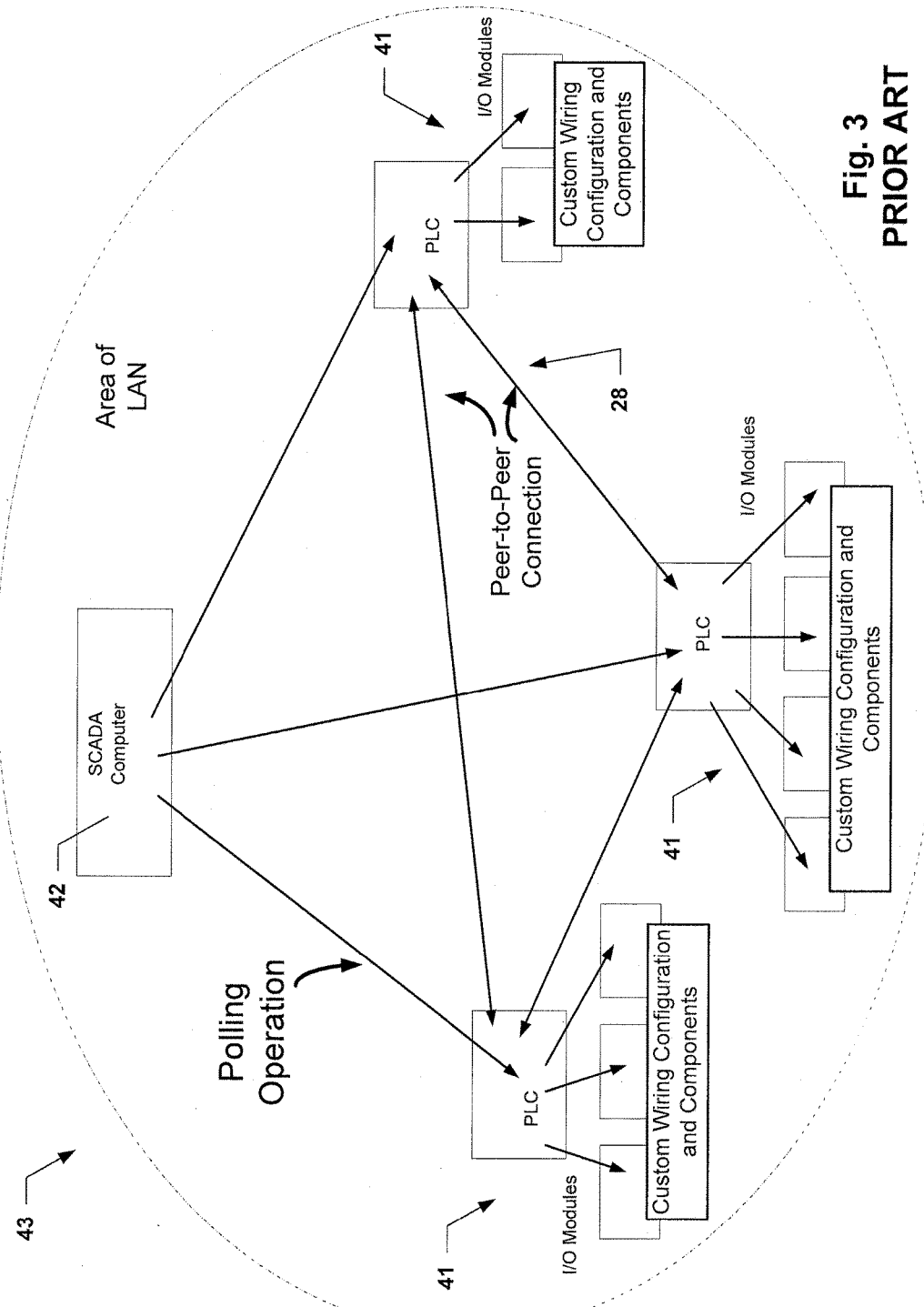
FIG. 3 depicts a prior SCADA system made up of a SCADA computer and three DCS nodes, each node made up a PLC with multiple I/O modules along with custom wiring configuration and components necessary to connect various sensors and actuators to the control system.

The present invention extends the teachings of U.S. Pat. Nos. 6,892,265, 7,216,191, and 7,822,896 and U.S. patent application Ser. Nos. 13/281,394 and 13/069,292, the disclosures of which are incorporated herein by reference. In the previous inventions, a configurable connectorized system is described in which any connector pin of such a system may be configured for a wide variety of electrical functions, such as measuring a voltage, producing a voltage, measuring a current, producing a current, producing various power voltage levels or even handling frequency information such as serial communication data.

A single version product built using the teachings of these patents has solved numerous industrial controls problems. When compared with traditional industrial control input/output modules, the configurable, connectorized input/output module of the invention dramatically reduces the number of additional components required such as power supplies and terminal blocks. The configurable, connectorized input/output system eliminates the need for many different fixed-configuration I/O modules by virtue of its ability to change the electrical configuration of its connector pins in order to provide any of a plurality of electrical signal formats or power.

Software-based electrical configurability is a principal reason that the I/O module wiring is simplified. Because configurability includes being able to provide device power, then sensors and actuators requiring power may receive it from the same connector or group of connectors. Wiring harnesses are dramatically simplified because the path of the electric signals is configured via software to provide point-to-point, controller-to-sensor and controller-to-actuator connections. The custom wiring configuration and components of the prior art are eliminated or automated.

The I/O module is further equipped with a powerful microprocessor including volatile and non-volatile memory as is customary for real time control products. The microprocessor further contains a real time operating system capable of running multiple control programs at one time. This configurable software environment provides for the I/O module to sequence multiple inputs and outputs to effect linearization, initialization, enabling, reading, holding, latching, counting, differentiating, resetting, presetting and other signal conditioning and device-level control.

The I/O module further employs its configurable software structure to perform closed-loop control, for example temperature control using any of the control laws including but not limited to proportional plus derivative plus integral or PID.

The I/O module further employs its configurable software structure to effect sequencing of controller setpoints as well as output values based upon a logic structure including input state and internal logic. Such a software structure would allow pre-programming a tank filling routine including sequencing valves and pumps and being responsive to tank level sensors.

The I/O module further employs a network connection capable of connecting in a peer-to-peer configuration with other configurable, connectorized I/O modules in order to pass information that would otherwise require a SCADA system to achieve the same data distribution.

One or more I/O modules connected in a LAN can therefore function as an autonomous control system responsive only to events inside the LAN, the autonomous control system utilizing the peer-to-peer network to coordinate the system in the absence of a prior art SCADA computer.

The I/O module may use its network apparatus to initiate a secure connection to a server either inside or outside the LAN, if outside preferentially via a named server on the Internet. The connection allows the I/O module to send a data message to the server, the data message containing control state variables to be archived in a data base by the server, the archiving being common for SCADA systems. The I/O module is capable of receiving a response data message to the sent data message, the response data message containing setpoints and parameters for use by the I/O module.

The I/O module can therefore function as a DCS when using peer-to-peer network connections. Further, the I/O module can function as a SCADA system when using peer-to-peer network connections and at least one connection to the server. Preferentially, all the I/O modules connect to the server, such that all relevant data is archived on the server and all the I/O modules are able to receive setpoints and parameters from the server.

The present invention can therefore provide the considerable benefits of a SCADA system as well as a DCS capable of operating autonomously and without a network connection to a SCADA computer. The present invention employs a server. Therefore, the server may be moved outside of the LAN, resulting in no server equipment located within the LAN and subject to requirements of system administration, maintenance and operation. When the ubiquitous server model is employed—often called cloud computing—then generic server systems may be used to host the server augmentation portion of the configurable connectorized control system, thus achieving high-level control with server-augmented, single part number configurable connectorized I/O modules.

Security of control systems is a broad topic. The present invention deals with secure architecture at a fundamental level. The configurable connectorized I/O module may be instructed to refuse any requests from clients requesting content from the web server within the configurable connectorized I/O module. At the same time, all communication with the server is initiated by the configurable connectorized I/O module and is encrypted using a private key system, the private key unique to each configurable connectorized I/O module. The configurable connectorized server-augmented architecture therefore improves security compared to the prior art because no outside connections are permitted to be made to the configurable connectorized I/O modules. All user-level communication, including the user interface (UI), is to a server where providing a secure connection is more common, for example in online banking connections. Therefore, compared to the SCADA computers of the prior art which must accept connections from outside the LAN, the control components of the present invention inside the LAN will not accept connections, thus helping to insure a fundamentally more secure control system.

Figure 4:
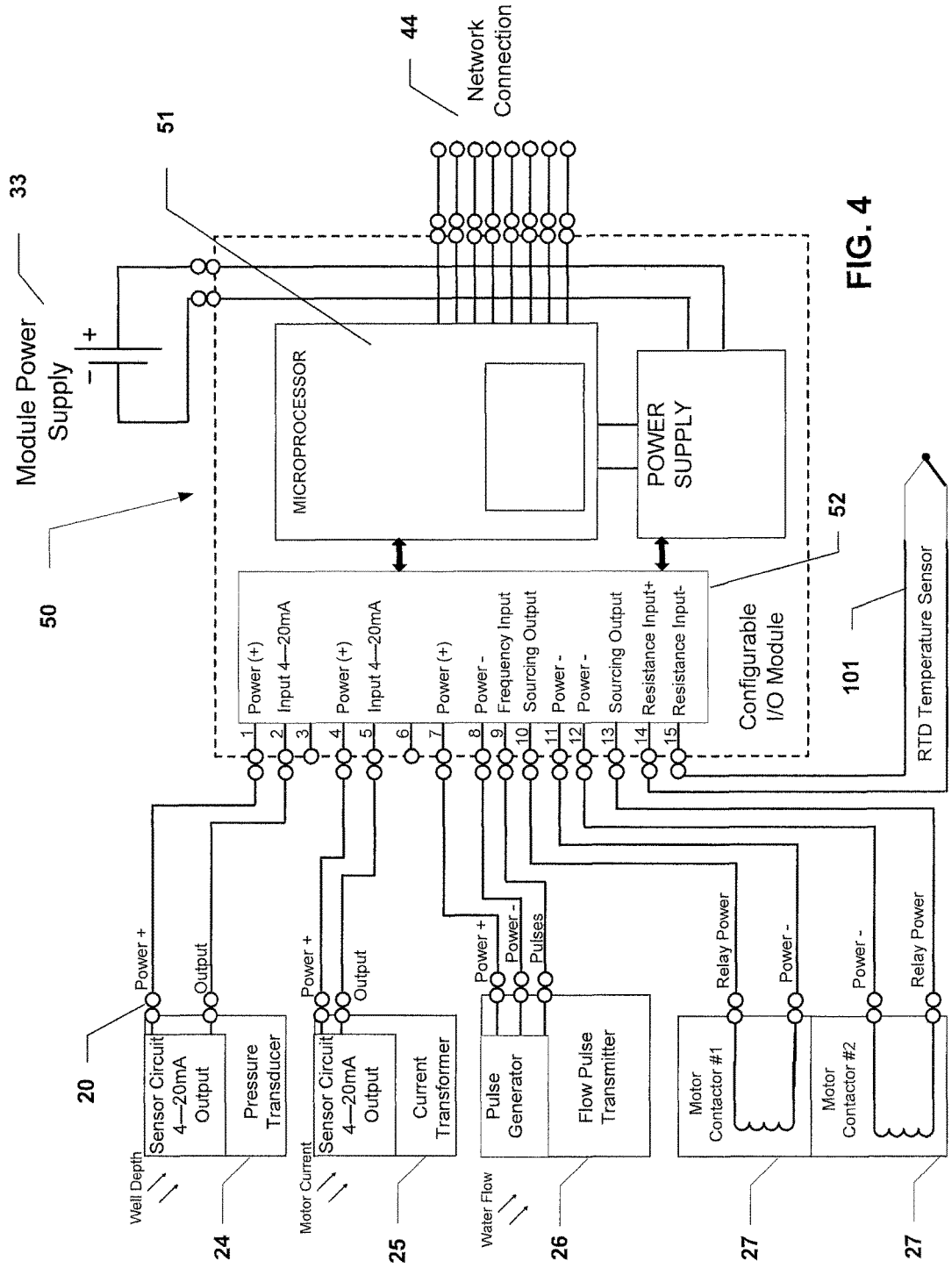
FIG. 4 depicts the present invention with a configurable, connectorized I/O module directly connecting to various sensors and actuators.

FIG. 4 depicts a configurable, connectorized I/O module 50 providing not only a sensor and actuator interface with a single I/O module 50, but also providing for a network connection 44 to effect a DCS 41 and a SCADA system 43 without a prior art SCADA computer 42 and without the need for polling operations to I/O module 50. Unlike prior art I/O modules, the present invention provides for direct connection from the configurable connector apparatus 52, thus obviating the need for the prior art custom wiring configuration and components. Note that the same connection means used in the prior art are used with the present invention, however far fewer connections are required, and those connections that are required are almost exclusively point-to-point, providing for simpler wiring. The sensors and actuators are preferably connected on a control panel or wiring area, with the wiring area being labeled with a label automatically produced using the software configuration information employed to configure the configurable, connectorized I/O module 50. The configurable connectorized I/O module 50 contains a microprocessor 51 and associated memory such that various control and communication functions may be performed by the module 50 to effect DCS and SCADA capabilities.

Figure 5:
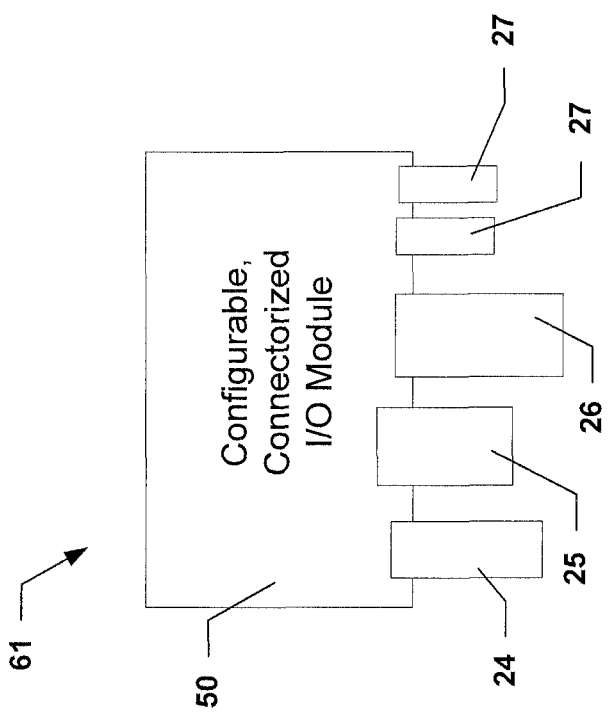
FIG. 5 depicts a DCS node of the present invention.

FIG. 5 depicts the present invention configurable, connectorized I/O module 50 configured as the simplest DCS 61 node. The I/O module 50 is capable of directly connecting to one or more peers in order to exchange information and therefore utilize distributed systems to manage a single system as in pumping water from one site to another with pumps located in one location and the tank level sensing being performed some distance away. The DCS architecture of the configurable connectorized I/O module allows this distributed control to be easily implemented across a network connection 44. Notably, the sensors and actuators 24, 25, 26 and 27 directly connect to the I/O module 50 without the need for prior art custom wiring configuration and components 30.

Figure 6:
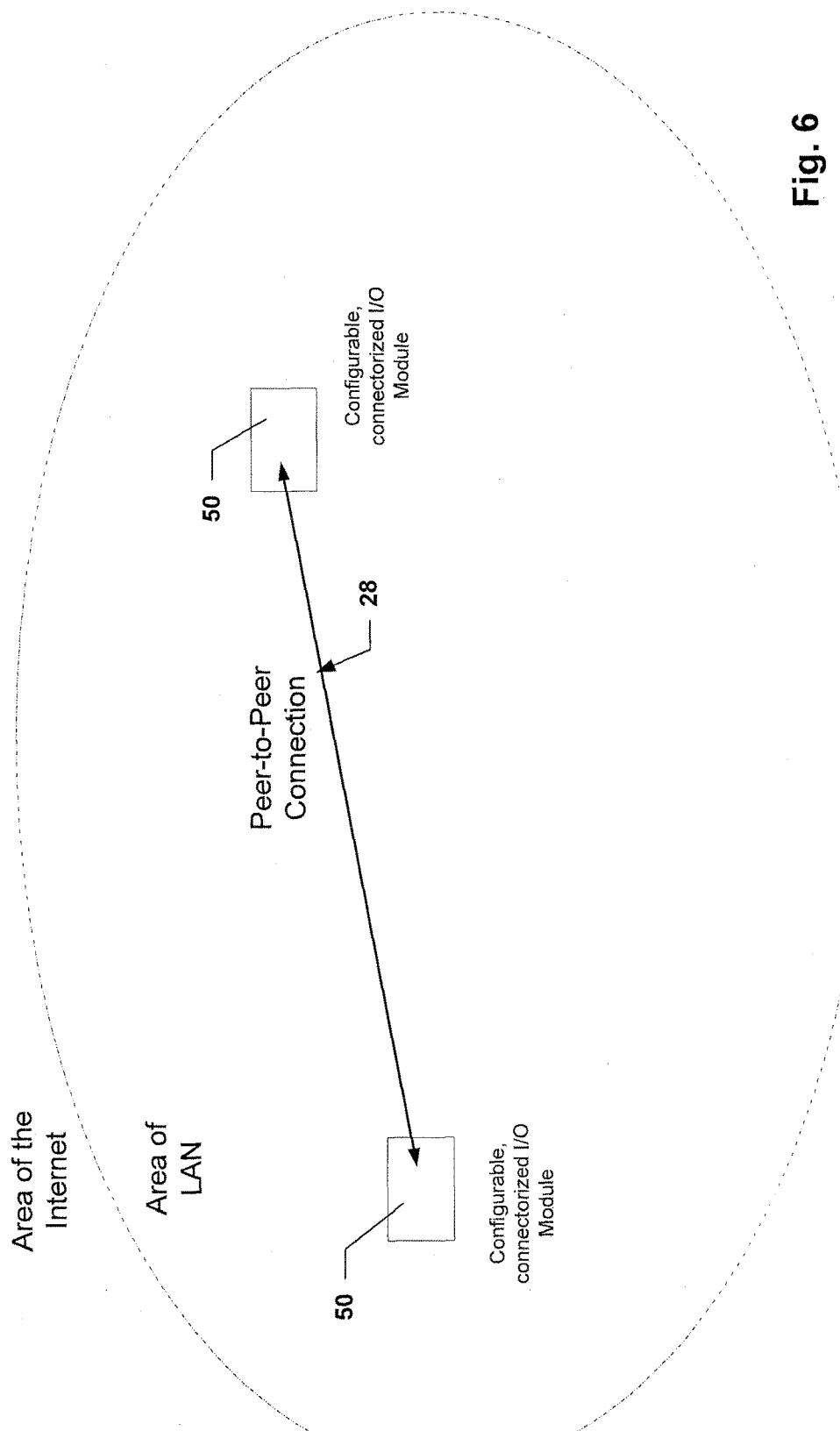
FIG. 6 depicts the simplest DCS configuration of the present invention, with the configuration employing just two I/O modules connected via a peer-to-peer connection.

For illustrative purposes, FIG. 6 depicts the present invention configurable connectorized I/O module 50 configured as the simplest DCS, the system comprising two I/O modules 50 employing peer-to-peer connection 28. The connection is preferentially inside of a LAN where network communication is controlled and deterministic. However, nothing precludes the connection 28 passing outside of the LAN, for example using the Internet. This configuration may be extended to more than two I/O modules and peer-to-peer connections.

Figure 7:
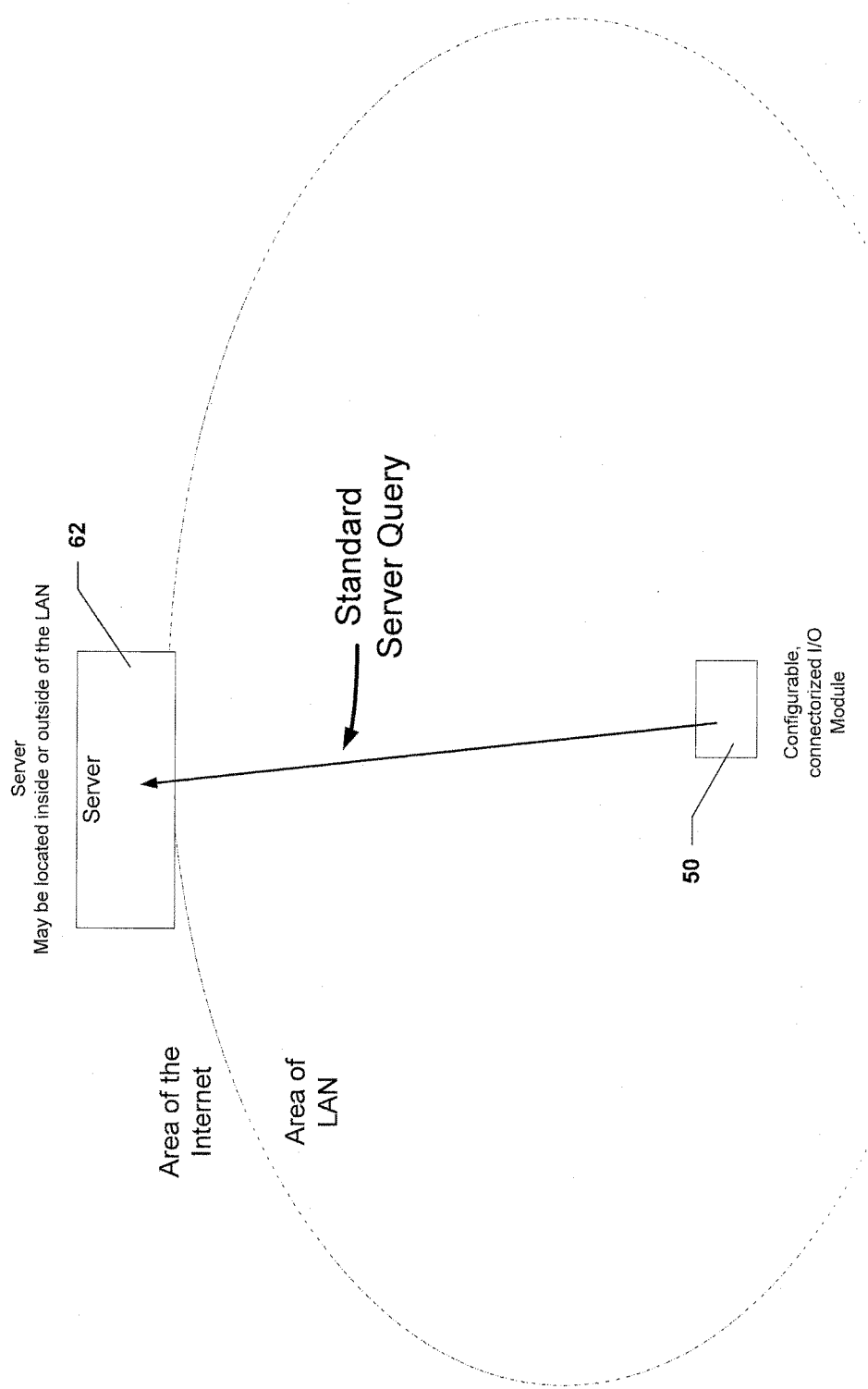
FIG. 7 depicts the simplest SCADA configuration of the present invention, with the configuration employing just one I/O module connected via a network connection providing for standard server queries.

For illustrative purposes, FIG. 7 depicts the present invention configurable connectorized I/O module 50 configured as the simplest SCADA system wherein a single configurable connectorized I/O module 50 is connected to sensors and actuators as well as to a server 62 to which data is sent and from which—in response to a request by the module 50 to the server 62—setpoints and controller parameters are received by the module 50. Preferably, the server 62 is outside the LAN where less costly and more convenient support is available for the server 62. But nothing in the present invention precludes the use of the server 62 inside the LAN. The communication protocol employed by the module to initiate the request is preferably the Internet Protocol TCP/IP. This configuration may be extended to more than two I/O modules connected to the server.

Figure 8:
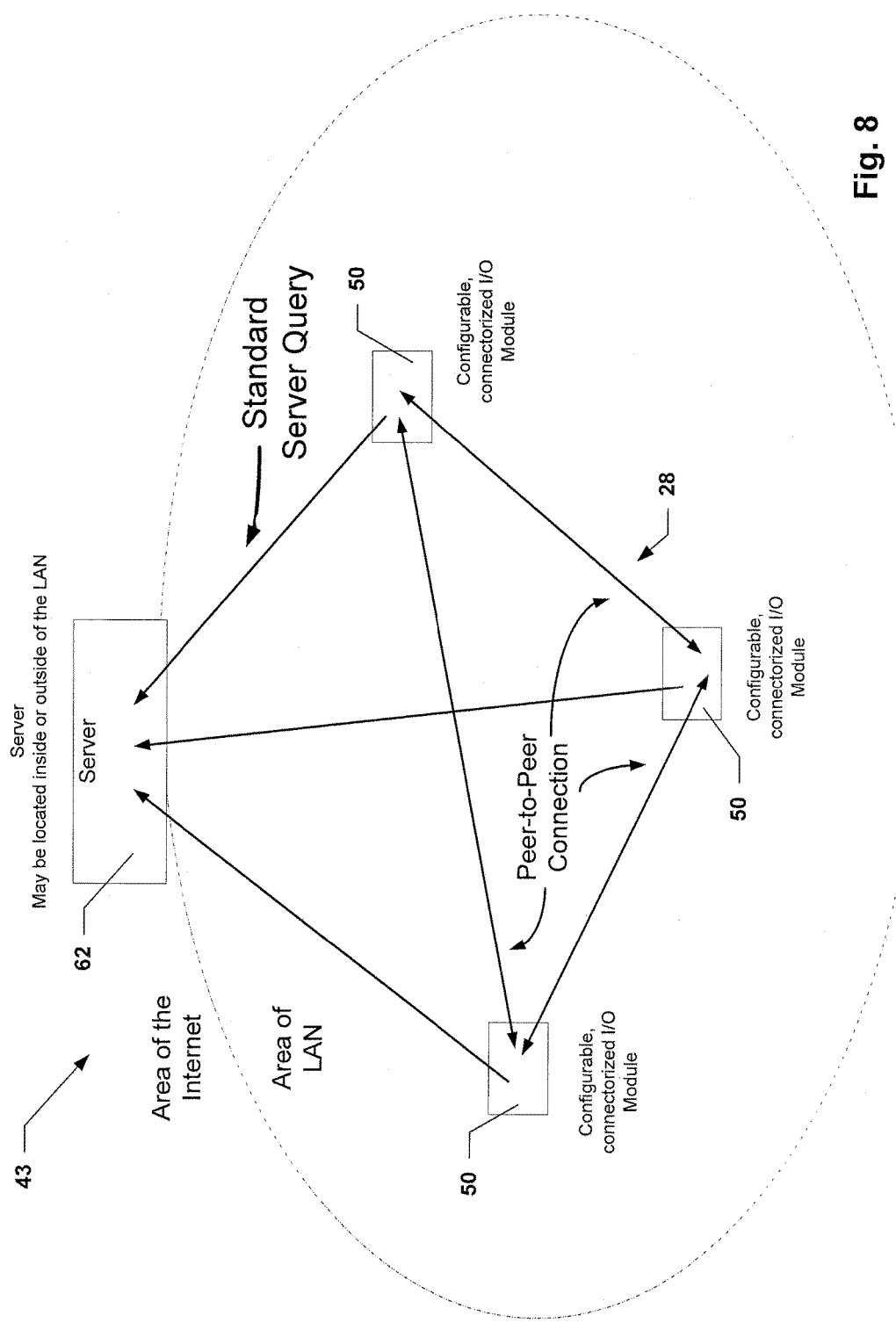
FIG. 8 depicts a DCS and SCADA system of the present invention, with the system made up of three configurable, connectorized I/O modules and a server, the server preferentially outside of the LAN and accessed via the Internet.

FIG. 8 depicts the present invention configurable connectorized I/O module 50 configured as a more complex SCADA system 43 typical of running an entire water delivery system with I/O modules 50 located at three geographical locations and a server 62 connected preferably over the Internet such that no server-level computers are located inside the LAN, therefore obviating the need for server administration, maintenance and local support. The I/O modules 50 are also connected using peer-to-peer connections 28 such that the modules 50 may exchange operational data, state and setpoints independent of any connection to the server 62. All communication from the I/O modules 50 to the server 62 is via standard server queries, for example employing the Internet Protocol TCP/IP, thus the I/O modules 50 need not accept unsolicited connections from outside of the LAN. Unsolicited connections could otherwise be used in order to gain unauthorized access to the module 50 thus compromising the security of the SCADA system 43.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method comprising:
   (a) electrically configuring a configurable, connectorized input/output module ("module") comprising a microprocessor, memory and a network interface adapted for electronic communications via one or more computer networks, the module including a control interface configurable for communicating with one or more different types and arrangements of sensors and actuators under control of a control system,
   wherein the module is configured using a software configuration method,
   wherein the module further comprises one or more configurable input/output pins for altering one or more electrical configurations of the module for performing one or more electrical functions using one or more control signals, wherein pathways of the control signals are configurable for providing point-to-point, controller-to-sensor or controller-to-actuator connections;
   (b) electrically connecting one or more sensors or actuators to the module using the configurable input/output pins;
   (c) communicating with a server computer via the network interface of the module using standard server queries via a secure connection initiated by the module for periodically transmitting control state information of the module to the server computer, wherein a response from the server computer is solicited, and
   wherein communications with the server computer are initiated by the module without the module receiving polling from the server computer wherein the module is adapted to reject unsolicited messages from the server computer for communications between the server computer and the module, separate from and in addition to message rejection functions of one or more firewalls disposed in the one or more computer networks;
   (d) receiving reply information transmitted from the server computer to the module, wherein the reply information includes one or more set points and controller parameters for the module; and
   (e) updating the module with the one or more set points in the reply information received from the server computer only if the received reply information is responsive to the solicitation by the module, and if a configurable predetermined period of time of expiration of the one or more set points received from the server computer has not passed.

2. The method of claim 1, further comprising the step of configuring a user interface for the server computer or a computer attached to the server computer using software in the module.

3. The method of claim 1, further comprising the step of using information from the module to generate a wiring guide for the system.

4. The method of claim 1, wherein the module provides independent control in the absence of a viable connection to the server computer.

5. The method of claim 1, further comprising:
   (a) setting an amount of time in which the server computer expects a transmission of control state information from the module; and
   (b) raising an alarm if control state information is not transmitted to the server computer within the set amount of time.

6. The method of claim 1, wherein a plurality of modules is used and further comprising employing peer-to-peer communications between at least two of the modules.

7. The method of claim 1, wherein the set points are limited to ranges that cannot be overruled by reply information received from the server computer.

8. The method of claim 1, wherein time-based set points are pre-loaded to the module to reduce the effect of a loss of connection to the server computer.

9. The method of claim 1, wherein set points employed by the module revert to pre-set values after loss of connection to the server computer for a pre-determined time.

10. The method of claim 1, wherein the module is connected to the server computer through an internet connection.

11. The method of claim 1, wherein the module will not accept a connection request from outside a LAN in which the module is located.

12. The method of claim 1, wherein the system is located within a LAN, and no component within the LAN uses software that needs to be upgraded or supported, thereby avoiding security vulnerabilities from accepting network connections.

13. An apparatus comprising:
   (a) a configurable, connectorized input/output module ("module") that comprises a microprocessor, memory and a network interface adapted for electronic communications via one or more computer networks, the module including a control interface configurable for communicating with one or more different types and arrangements of sensors and actuators under control of a control system,
   wherein the module is configured with software,
   wherein the module further comprises one or more configurable input/output pins for altering one or more electrical configurations of the module for performing one or more electrical functions using one or more control signals, wherein pathways of the control signals are configurable for providing point-to-point, controller-to-sensor or controller-to-actuator connections;
   (b) one or more sensors or actuators electrically connected to the module, using the programmable input/output pins; and
   (c) a server computer, in communication with the module via the network interface, the server computer adapted to communicate one or more set points and control parameters, including actuator state information, to the module via one or more solicited responses to requests from the module acting as a client of the server computer, wherein control state information of the module is periodically transmitted to the server computer with a solicitation of a response from the server computer using standard server queries via a secure connection initiated by the module, wherein communications with the server computer are initiated by the module without the module receiving polling from the server computer wherein the module is adapted to reject unsolicited messages from the server computer for communications between the server computer and the module, separate from and in addition to message rejection functions of one or more firewalls disposed in the one or more computer networks, and the module receives reply information transmitted from the server computer to the module, the reply information including one or more set points and controller parameters for the module, and wherein the module is updated using the one or more set points in the reply information received from the server computer only if the received reply information is responsive to the solicitation by the module, and a configurable predetermined time of expiration of the one or more set points received from the server computer has not passed.

14. The apparatus of claim 13, further comprising software to configure a user interface on the server computer or a computer attached to the server computer.

15. The apparatus of claim 13, further comprising information from the apparatus to generate a wiring guide for the apparatus.

16. The apparatus of claim 13, wherein the module provides independent control of the apparatus system in the absence of a viable connection to the server.

17. The apparatus of claim 13, wherein a plurality of modules is used and there are peer-to-peer connections between at least two of the modules.

18. The apparatus of claim 13, wherein the set points are limited to ranges that cannot be overruled by reply information received from the server.

19. The apparatus of claim 13, wherein time-based set points are pre-loaded to the module to reduce the effect of a loss of connection to the server.

20. The apparatus of claim 13, wherein set points employed by the module revert to pre-set values after loss of connection to the server for a pre-determined time.

21. The apparatus of claim 13, wherein the module is connected to the server through an internet connection.

22. The apparatus of claim 13, wherein the module will not accept a connection request from outside a LAN in which the module is located.

23. The apparatus of claim 13, wherein the system is located within a LAN, and no component within the LAN uses software that needs to be upgraded or supported, thereby avoiding security vulnerabilities from accepting network connections.

24. The apparatus of claim 13 wherein the module is adapted to implement Supervisory Control and Data Acquisition (SCADA) and Distributed Control Systems (DCS) capabilities in a single device without a network connection to a SCADA server computer.

25. The apparatus of claim 13 wherein the module software provides a computer file for electrically configuring the configurable input/output pins in accordance with one or more sensors or actuators that are electrically connected with the module via the control interface.

26. The method of claim 1 wherein the configurable input/output pins are configured using a computer file.

27. The method of claim 1 wherein the one or more computer networks comprise a cloud-based computer network.

* * * * *